No. 855,572.
PATENTED JUNE 4, 1907.
W. D. HAWK.
MOTOR CAR.
APPLICATION FILED AUG. 23, 1906.
3 SHEETS—SHEET 2.
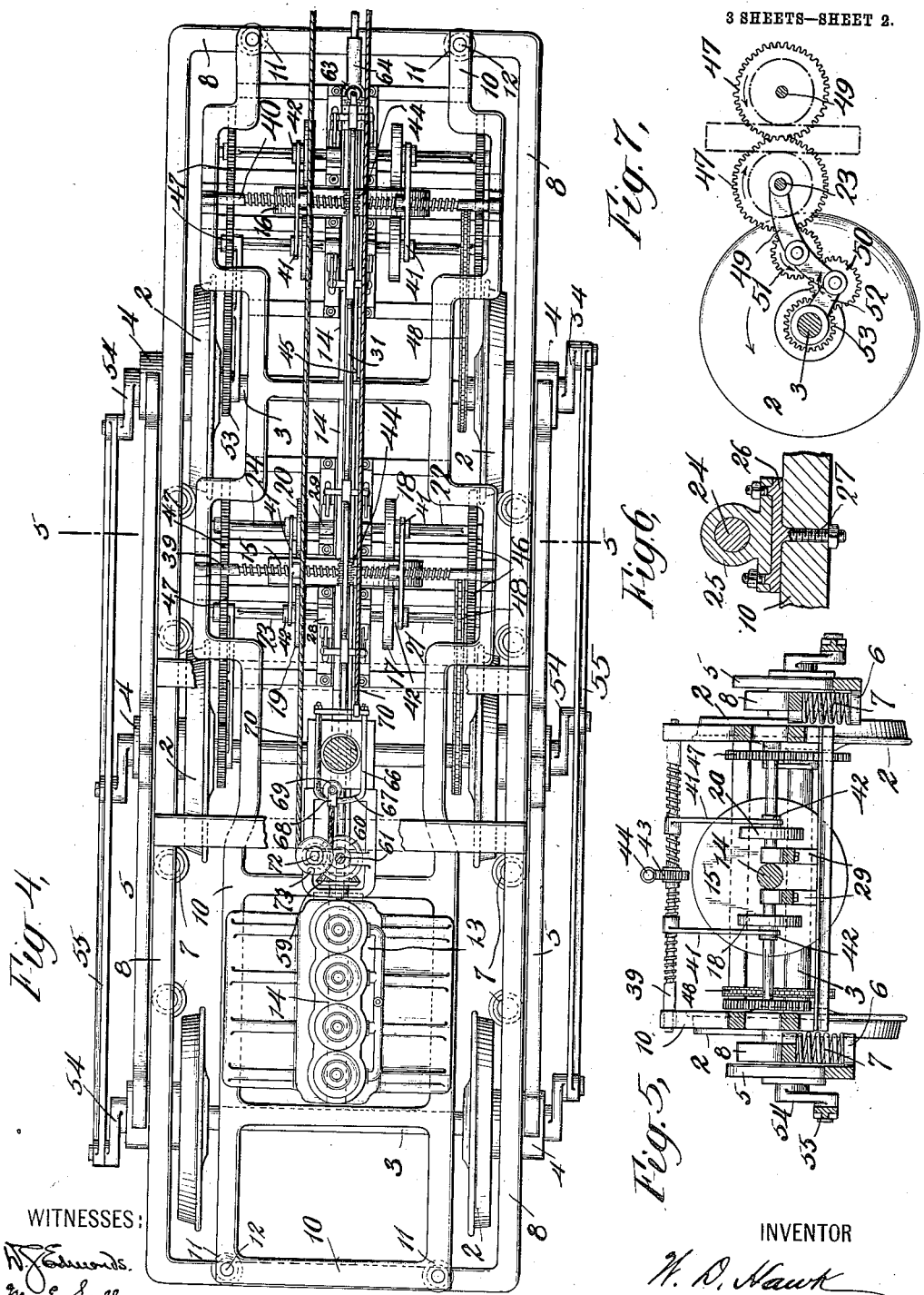
WITNESSES:
INVENTOR
W. D. Hawk
BY
ATTORNEY No. 855,572.
PATENTED JUNE 4, 1907.
W. D. HAWK.
MOTOR CAR.
APPLICATION FILED AUG. 23, 1906.
3 SHEETS—SHEET 3.
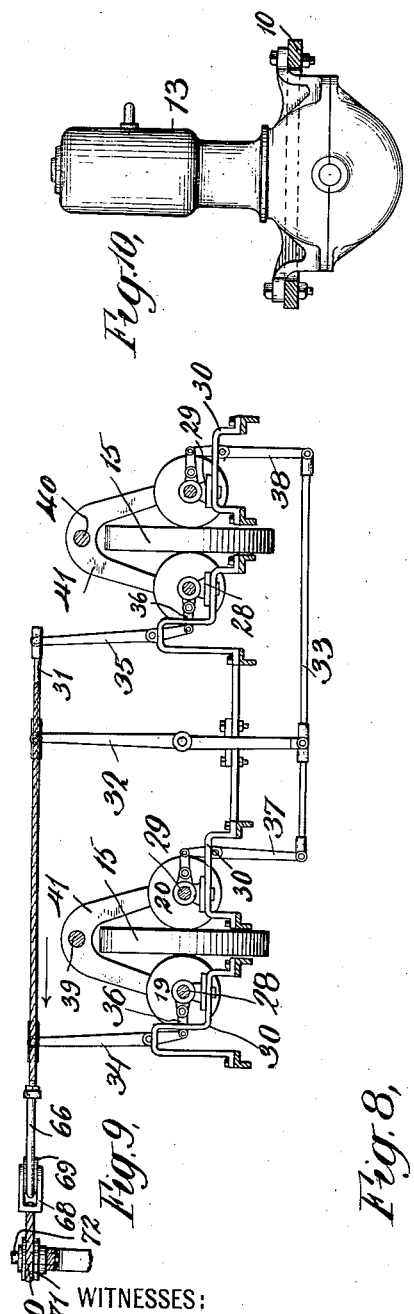
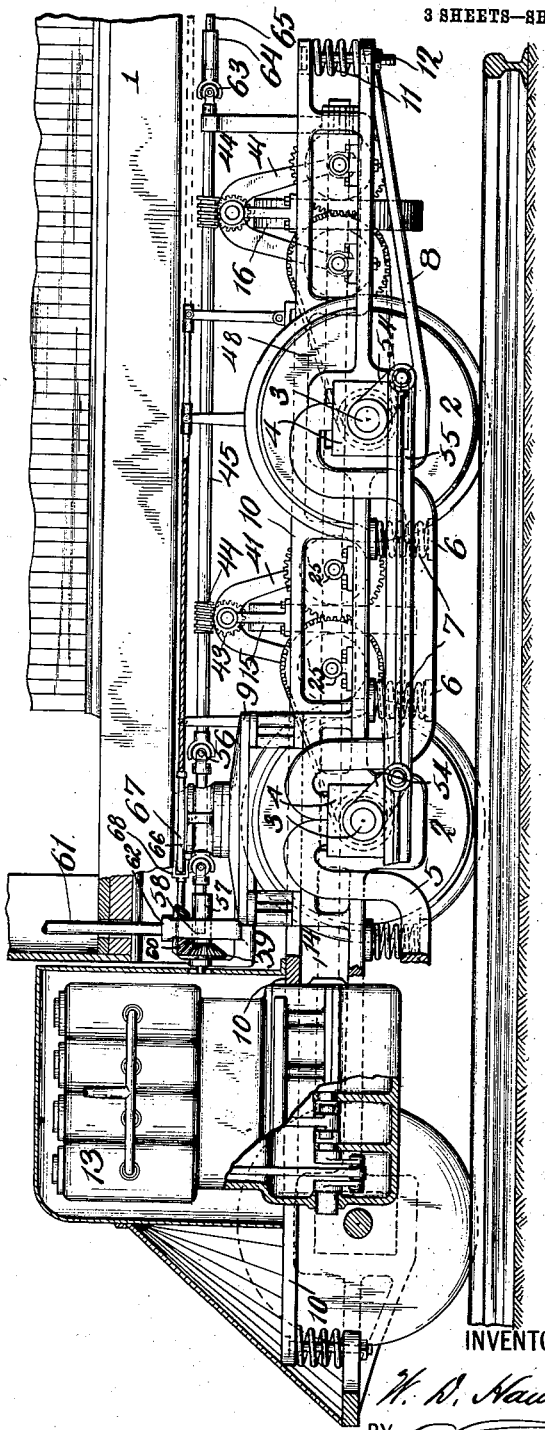
WITNESSES:
INVENTOR
W. D. Hawk
BY
ATTORNEY

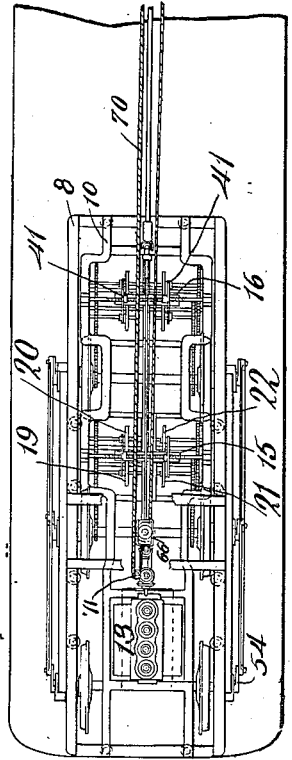

UNITED STATES PATENT OFFICE.

WALTER D. HAWK, OF CHICAGO, ILLINOIS.

MOTOR-CAR.

No. 855,572.  Specification of Letters Patent.  Patented June 4, 1907.

Application filed August 23, 1906. Serial No. 331,769.

*To all whom it may concern:*

Be it known that I, WALTER D. HAWK, a citizen of the United States, residing at Chicago, in the county of Cook and State of Illinois, have invented certain new and useful Improvements in Motor-Cars, of which the following is a specification.

This invention concerns motor cars and its object is to provide a self-propelled car of large size and capable of comparatively high speed, which is economical in operation and which is adapted particularly for use on short lines of railway which are tributary to main lines.

In accordance with my invention, I employ a car-body of considerable length pivotally mounted on bogie-trucks. These trucks are preferably of the six-wheel type and one or both of them are provided with a motor and transmission mechanism for connecting the motor in driving relation to the wheels. This mechanism is of the type operating by the frictional engagement of contacting parts, and in order to provide a large number of frictional surfaces through which the power of the engine is transmitted so that slipping is minimized, I employ two separate transmission mechanisms for each engine to connect the latter in driving relation to the axles of the truck. The type of mechanism I prefer to employ is that shown in my application, Serial Number 285,075, filed October 30, 1905, having a disk driven by the engine and rollers on opposite sides of the disk-axis adapted to be moved radially of and into and out of engagement with the disk. Since the corresponding rollers and their shafts, in such a transmission mechanism, rotate in opposite directions, I so connect them to the axle of the truck that both will drive it in the same direction, this being preferably done by means of a chain drive for one shaft and gearing for the other arranged to permit movement of the engine and transmission mechanism relatively to the axle on their supporting springs which relieve them from the constant vibration to which they would otherwise be subjected. The application of the power of the engine to the axle is controllable from the car-body at either end thereof irrespective of the position of the truck relatively thereto and if both trucks are provided with engines and transmission mechanisms these may both be so controlled.

I have illustrated the preferred embodiment of my invention in the accompanying drawings, in which Figure 1 is a plan view of the two trucks, showing the car-body in outline, Fig. 2 is a side elevation of the car, broken away in part, Fig. 3 is a detail view hereinafter referred to, Fig. 4 is an enlarged plan view of one of the trucks, Fig. 5 is a section on line 5—5 of Fig. 4, Figs. 6 and 7 are detail views hereinafter referred to, Fig. 8 is an enlarged side view of the truck, broken away in part, Fig. 9 is a view showing the mechanism for operating the roller shafts, and Fig. 10 is a view showing the manner of supporting the engine.

Referring to these drawings, 1 indicates the car-body pivotally mounted upon two bogie-trucks. These trucks are preferably of the six-wheel type and are so arranged that the forward pair of wheels of each truck extends out beyond the end of the car. In the drawings I have shown both trucks provided with a motor and suitable transmission mechanism for connecting it to the axles, but I wish it understood that, if desired, only one of the two trucks may have propelling mechanism.

The construction of the trucks will be best understood from Figs. 4 and 8 and as they are similar in all respects a description of one will suffice. The wheels 2 are mounted on axles 3 extending through journal boxes 4. Rigidly connecting the journal boxes on each side of the truck is a side member 5 having depressed portions between the pairs of axles and on these depressed portions are formed offsets 6 to receive and support the lower ends of heavy coiled springs 7. The side-frames 8 of the truck have rectangular openings therein in which the journal-boxes 4 are adapted to slide vertically to permit of vertical movement of the frames and all the parts carried thereby relatively to the members 5 and axles 4, such movement being permitted by the supporting springs 7 which therefore serve to relieve the car-body and other parts from vibration; the springs 7 support the side-frames 8 upon their upper ends, means being provided to prevent lateral movement of the springs. Rigidly secured upon the side-frames 8 is a heavy bearing plate 9 having a socket at its center to receive the king-pin which is secured upon the bottom of the car-body, and about which the truck turns relatively to the car-body. Between the truck frame and the car-body is an auxiliary frame upon which the engine and the transmission mechanism are mounted. This frame is supported by springs 11 upon the side-frames 8 so that the engines and the transmission mechanism have the benefit of both springs 11 and springs 7. The springs 11 are located at the four corners of the auxiliary frame and preferably four additional springs 11 are provided intermediate the ends of the auxiliary frame. Each of these springs has a bolt 12 extending therethrough and nuts upon the bolt to limit the amount of movement of the auxiliary frame.

The engine 13 is preferably of the internal combustion type and arranged for quickly reversing its direction of rotation; it is rigidly secured upon the side members of the auxiliary frame 10 between the axle of the truck which lies forward of the end of the car and the middle one of the three axles. The cylinders of the engine may be arranged vertically and extend up forward of the dashboard of the car a short distance. The shaft of the engine extends longitudinally of the truck and is connected to the transmission mechanism which serves to transmit the power of the engine to the axles of the truck. Preferably, I employ frictional transmission mechanism by which the power is transmitted by friction wheels adapted to be moved into and out of contact with each other.

In order that a large amount of power may be transmitted to the axles and slipping of the friction surfaces minimized, I provide a large number of contacting friction surfaces so that the total power of the engine is divided among all of these. To accomplish this, I employ two separate transmission mechanisms for a single engine and each of these mechanisms is of the type having a disk driven by the engine, and two pairs of friction rollers adapted to be moved into and out of engagement therewith, the two pairs being located on opposite sides of the axis of the disk and the rollers of each pair being on opposite sides of the disk itself. The shaft 14 of the engine, as above stated, extends longitudinally of the truck and it has mounted thereon two friction disks 15 and 16, one located between the middle and rear axles 3 of the truck and the other located in the rear of the rear axle 3. Four friction-rollers 17, 18, 19 and 20 are splined on transverse shafts 21, 22, 23 and 24, respectively, which are adapted to be moved laterally to carry the peripheries of the rollers into and out of engagement with the opposite faces of the disk 15 and four similar rollers are similarly mounted and arranged to engage the disk 16. The non-adjacent ends of the shafts 21, 22, 23 and 24 are carried by pivoted bearings mounted on depending portions of the auxiliary frame 10. The construction of these bearings is illustrated in Fig. 6 from which it will be seen that the bearing 25 is secured upon a plate 26 having a cylindrical projection 27 extending through an opening in the frame 10 so that the bearing can turn about the projection 27 as a pivot. The adjacent ends of shafts 21 and 23 are carried by bearings 28 and the adjacent ends of shafts 22 and 24 by bearings 29. These bearings are adapted to slide horizontally toward and away from each other upon bars 30 extending between cross-members on the auxiliary frame. The mechanism for moving the bearings 28 and 29 toward and away from each other to carry the friction-rollers into and out of engagement with the friction disk will be best understood by reference to Fig. 9. Extending longitudinally of the truck and directly over the center line thereof is a rod 31 and a link 32, pivotally mounted upon bar 30, is connected at one end to rod 31 and at the other to a rod 33 lying below and parallel to rod 31. Two levers 34 and 35 are pivoted upon the bars 30 and at their upper ends are connected to rod 31; the lower ends of the levers 34 and 35 are bifurcated and the ends of the bifurcated arms are connected by links 36 with the two bearings 28 of each of the two transmission mechanisms. Two levers 37 and 38 are pivoted upon the bars 30 and connected at their lower ends with rod 33; the upper ends of these levers are similarly bifurcated and linked to the two bearings 29 of each of the two transmission mechanisms. It will be readily understood that this construction is such that when rod 31 is moved axially in one direction, rod 33 is similarly moved in the opposite direction and all of the friction-rollers are moved toward or away from their respective friction disks, a forward movement of rod 31 in the direction of the arrow in Fig. 9 moving the rollers into engagement with the disks and a backward movement carrying them out of engagement. The mechanism for operating rod 31 will be hereinafter described.

Mounted directly over each of the disks 15 and 16 in bearings carried by the auxiliary frame are shafts 39 and 40 each having reverse threads of large pitch cut therein. On each of the threaded portions of each of these rods is a yoke 41, the arms of which are bifurcated at their ends and extend down into peripheral grooves in hubs 42 formed on the friction-rollers lying directly below the yoke. The portions of the yoke extending into each of these grooves are spread sufficiently to permit of the necessary amount of lateral movement of the shafts carrying the rollers. At the center of each of the rods 39 and 40 is a worm wheel 43 meshing with a worm 44 on a shaft 45, extending lengthwise of the truck and mounted in bearings thereon. By rotating the shaft 45, the shafts 39 and 40 are simultaneously rotated and the yokes on each of these shafts are moved toward and away from each other, thereby carrying the pairs of friction rollers toward and away from the axes of the disks 15 and 16. The mechanism for rotating shaft 45 will be hereinafter explained.

On shafts 21 and 22 are a pair of intermeshing gears 46 and on shafts 23 and 24 are a pair of intermeshing gears 47 so that the power of shafts 22 and 24 is transmitted to shafts 21 and 23 respectively. Since the rollers on the shafts 21 and 23 are on opposite sides of the axis of disk 15 these shafts will be driven in opposite directions when the two rollers are in engagement with the disk and therefore shafts 21 and 23 cannot be similarly connected to one of the axles of the truck to drive it in the same direction; and the means for transmitting the power from these shafts to the axle must be such as will permit of vertical movement of the transmission mechanism relatively to the axles of the truck, since that mechanism is carried by the spring-supported auxiliary frame. I therefore connect the shaft 21 of the transmission mechanism nearer the engine to the middle one of the axles of the truck by means of a chain 48 running on sprocket wheels mounted on shaft 21 and on the axle, as shown in Fig. 3. The shaft 23 is connected to the axle by means of intermeshing gears arranged to be held constantly in mesh throughout the vertical movements of the transmission mechanism relatively to the axles of the truck.

Referring to Fig. 7, it will be seen that a link 49 is pivotally mounted at one end upon axle 23 and at the other end thereof is formed a bearing for the shaft of a gear 50 which meshes with a gear 51 carried by the link 49 and meshing with the gear 47 on the shaft 23. The shaft of gear 50 also extends through a bearing in the end of a link 52 pivotally mounted at its other end upon the axle 3. Keyed on the axle is a gear 53 meshing with the gear 50. It will be seen that by this construction even though the shafts 21 and 23 rotate in opposite directions they will both tend to drive the axle of the truck in the same direction since the one is connected to the shaft by the chain 45 and the other by the train of gears; and throughout the vertical movements of the transmission, this connection is always maintained since the links 49 and 52 always hold the gears in the proper relation. The parts of the transmission mechanism rearward of the rear shaft 3 are all similar in construction and arrangement to those above described in connection with the transmission located between the second and third axles and the shafts 21 and 23 thereof are connected to the rear axle 3 in the same manner as that above described. The power of the engine is therefore transmitted from the engine shaft through the disks 15 and 16 thereon to eight friction rollers making contact with these disks and each of these pairs of contact surfaces transmit only one-eighth of the total power of the one motor truck. By means of the gearing all of the power is transmitted from the eight shafts of these rollers to the axles of the truck. On the extreme ends of each of the three axles are cranks 54, and those on each side of the truck are connected by a connecting rod 55. Also, the provision of an auxiliary frame upon the truck supported upon springs and carrying the engine and all of the transmission mechanism, relieves the delicate parts of the engine and transmission mechanism from the continual jarring to which they would otherwise be subjected while the car is running.

I will now describe the mechanism for operating the parts of the transmission mechanism from the car-body. As above stated each of the two trucks may be provided with controlling mechanism, and in this case I so construct the controlling mechanism that the transmission of power from both engines to the axles of both trucks may be controlled from the car-body at either end thereof. The shaft 45 for effecting the radial movement of the friction rollers with respect to the friction disks extends through an opening directly below the king-pin of the truck and is provided with universal joints 56 and one or more extension joints 57. The forward end of shaft 45 extends through a bearing 58 secured to the bottom of the car-body and on its extreme end carries a bevel-gear 59. This bevel-gear meshes with a similar gear 60 upon the lower end of a shaft 61 mounted in suitable bearings 62 and extending up to a position convenient for the operator who stands upon the platform of the car, the shaft being provided with a suitable operating handle. At its rear end, the shaft 45 is connected by a universal joint 63 and an extension joint 64 to a shaft 65. This, at its other end, is similarly connected to the end of the shaft 45 on the other truck of the car so that by operating the controlling shaft 61 at either end of the car, the shafts 45 on both of the trucks are simultaneously rotated to effect a radial movement of all of the friction-rollers on both of the trucks. The forward end of the rod 31 is connected to one end of a yoke 66, the sides of which lie on opposite sides of the narrow portion of bearing plate 9 of the truck. The forward end of yoke 66 is curved on the arc of a circle about the pivotal axis of the truck as a center, as shown at 67, Fig. 4. A member 68 has arms extending above and below the portion 67 of yoke 66 and in the ends of these arms is pivoted a roller 69 adapted to move back and forth across the portion 67. A cable 70 is connected to the member 68 and is wound three or four times around a drum 71 secured on a shaft 72 which passes up through the platform of the car-body and is provided at its upper end with an operating handle. At the middle of the portion of the cable which is wound around the drum, the cable is secured to the drum, as indicated at 73, Fig. 4. The other end of cable 70 extends lengthwise of the car to the other truck, where it is similarly wound around and secured to a drum 74 on a rotatable shaft which passes up through the rear platform of the car. The extreme end of the cable is secured to a member similar to the member 68 on a yoke to which the operating rod on the rear truck is connected. The two drums 71 and 74 are located as near the pivotal axes of the two trucks as the arrangement of the parts of the trucks will permit. It will thus be seen that when either of the yokes 66 is reciprocated by rotating the drum 71 or 74 adjacent thereto, the yoke 66 on the other truck is similarly moved but always in the opposite direction, by means of the cable 70 so that the operator when standing at either end of the car-body can simultaneously move all of the friction-rollers upon each of the two trucks into or out of engagement with their respective friction disks.

The operation of the car as thus constructed will be understood from the foregoing description. The engine is of the reversible type so that reversal of the direction in which the car runs is effected by reversing the direction in which the engine runs. The provision of the large number of contacting friction-rollers for transmitting the power of the engine to the axles subdivides the power between the several pairs of rollers so that, though the engine is capable of developing a large amount of power, each roller receives and transmits only a comparatively small amount and there is therefore little slipping. All of the power of these rollers is delivered to the axles when the car is running in either direction and the operator while standing at either end of the car has full control of the position of all of the rollers for starting and stopping the car and varying its speed.

Having described my invention, what I claim as new and desire to secure by Letters Patent is:

1. In a car, the combination of a frame, axles journaled therein and wheels on the axles, an engine mounted on the frame, a friction disk driven by the engine, rollers adapted to make contact simultaneously with said disk on opposite sides of the disk-axis, shafts for said rollers, a chain connecting one of said shafts with an axle of the truck, and gears connecting the other of said shafts to said axle, substantially as described.

2. In a car, the combination of a frame, axles journaled therein and wheels on the axles, an engine, a transmission mechanism, springs supporting the engine and said mechanism upon the frame, said mechanism including a friction disk driven by the engine, rollers adapted to make contact simultaneously with said disk on opposite sides of the disk-axis and shafts for said rollers, a chain connecting one of said shafts to an axle of the truck, gears connecting the other of said shafts to an axle of the truck, and means for holding said gears in mesh throughout the movements of the spring-supported transmission mechanism relatively to the axles, substantially as described.

3. In a car, the combination of a pivoted truck having a frame, axles and wheels, an auxiliary frame, springs supporting the same upon the truck frame, an engine mounted on said auxiliary frame, a disk driven thereby, two pairs of friction-rollers mounted on opposite sides of the disk-axis, the rollers of each pair being on opposite sides of the disk, a shaft for each of said rollers mounted on said auxiliary frame, means for moving said shafts laterally to carry the rollers thereon into and out of engagement with said disk, gearing between the shafts of the rollers of each pair, a chain connecting one of the shafts of said rollers with an axle of the truck, gears connecting the shaft of a roller of the other pair to said axle, and means for holding said gears in mesh throughout the movements of the auxiliary frame relatively to the axles, substantially as described.

4. In a car, the combination of a car-body, a bogie-truck on which the car-body is pivotally mounted, an engine on the truck, a plurality of transmission mechanisms on the truck, each consisting of a disk driven by the engine, pairs of rollers adapted to make contact with the disk on opposite sides of the disk-axis, the rollers of each pair being adapted to engage the disk on opposite sides thereof, and means for moving the rollers radially of and into and out of engagement with said disk, and means for transmitting power from the shafts of said rollers to the axles of the truck, substantially as described.

5. In a car, the combination of a car-body, a bogie-truck on which the car-body is pivotally mounted, an auxiliary frame spring-supported on the truck, an engine and a plurality of transmission mechanisms mounted on said auxiliary frame, each of said mechanisms consisting of a disk driven by the engine, a plurality of rollers, and means for moving said rollers radially of and into and out of contact with said disk, and means for transmitting power from the shafts of said rollers to the axles of the truck throughout the movements of the auxiliary frame relatively to the axles, substantially as described.

6. In a car, the combination of a car-body, a six-wheel bogie-truck on which the car-body is pivotally mounted, an engine upon the truck between two adjacent axles thereof, two transmission mechanisms mounted on the truck one between two adjacent axles thereof and the other adjacent to one of said axles, each of said mechanisms consisting of a disk driven by the engine, a plurality of rollers, and means for moving said rollers radially of and into and out of engagement with said disk, and means for transmitting power from the shafts of said rollers to the axles of the truck, substantially as described.

7. In a car, the combination of a car-body, two bogie-trucks on which the car-body is pivotally mounted, an engine on one of said trucks, a transmission mechanism on said truck comprising a disk driven by the engine and rollers adapted to make contact with said disk on opposite sides of the disk-axis, gearing connecting the shafts of said rollers to the axles of the truck, and means operated from the car-body at either end thereof for moving said rollers radially with respect to the disk, substantially as described.

8. In a car, the combination of a car-body, two bogie-trucks on which the car-body is pivotally mounted, an engine and a transmission mechanism mounted on each of said trucks, said mechanisms each comprising a disk driven by the engine and rollers adapted to make contact with the disk on opposite sides of the disk-axis, gearing connecting the shafts of said rollers to the axles of the trucks, and means operated from the car-body at either end thereof for simultaneously moving the rollers of both said transmission mechanisms radially of their respective disks, substantially as described.

9. In a car, the combination of a car-body, two bogie-trucks on which the car-body is pivotally mounted, an engine on one of said trucks, a transmission mechanism on said truck comprising a disk driven by the engine and rollers adapted to make contact with said disk, gearing connecting the shafts of said rollers with the axles of the truck, and means operated from the car-body at either end thereof for moving said rollers into and out of engagement with said disk, substantially as described.

10. In a car, the combination of a car-body, two bogie-trucks on which said car-body is pivotally mounted, an engine and a transmission mechanism on each of said trucks, said mechanisms each comprising a disk driven by the engine and rollers adapted to make contact with said disk, gearing connecting the shafts of said rollers to the axles of the trucks, and means operated from the car-body at either end thereof for simultaneously moving the rollers of both of said transmission mechanisms into and out of engagement with their respective disks, substantially as described.

11. In a car, the combination of a car-body, two bogie-trucks on which the car-body is pivotally mounted, an engine and a transmission mechanism on each of said trucks, said mechanisms each comprising a disk driven by the engine, rollers adapted to make contact with said disk and an operating means connected to said rollers for moving them into and out of engagement with said disk, gearing between the rollers of said mechanisms and the axles of the trucks and means operated from the car-body at either end thereof and connected to said operating means on both of the trucks for moving them simultaneously in opposite directions, substantially as described.

This specification signed and witnessed this 4th day of August, 1906.

WALTER D. HAWK.

Witnesses:
GEORGE F. SWAIN,
GEORGE M. HOKE.